(12) United States Patent
Syu

(10) Patent No.: US 8,447,920 B1
(45) Date of Patent: May 21, 2013

(54) SYSTEM AND METHOD FOR MANAGING DATA ACCESS IN NON-VOLATILE MEMORY

(75) Inventor: Mei-Man L. Syu, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 287 days.

(21) Appl. No.: 12/825,779

(22) Filed: Jun. 29, 2010

(51) Int. Cl.
G06F 12/00 (2006.01)

(52) U.S. Cl.
USPC ........... 711/103; 711/100; 711/102; 711/168; 711/173; 711/200; 711/202; 365/189.18; 365/189.03; 365/189.17; 365/189.12; 365/230.01; 365/230.03

(58) Field of Classification Search
USPC ............... 711/100, 102–103, 168, 173, 200, 711/202; 365/189.011, 189.03, 189.17, 189.18, 365/189.2, 230.01, 230.03, 230.05
See application file for complete search history.

(56) References Cited

U.S. PATENT DOCUMENTS

| | | | |
|---|---|---|---|
| 6,839,827 B1 * | 1/2005 | Beardsley et al. ............ | 711/206 |
| 7,103,732 B1 * | 9/2006 | Chang et al. ................ | 711/156 |
| 7,506,098 B2 * | 3/2009 | Arcedera et al. ............. | 711/103 |
| 2005/0144361 A1 * | 6/2005 | Gonzalez et al. ............ | 711/103 |
| 2006/0168392 A1 | 7/2006 | Hwang | |
| 2007/0094445 A1 | 4/2007 | Trika et al. | |
| 2007/0156998 A1 | 7/2007 | Gorobets | |

* cited by examiner

Primary Examiner — Tuan Thai
Assistant Examiner — Zhuo Li

(57) ABSTRACT

The present invention is directed to systems and methods for improving access to non-volatile solid-state storage systems. Embodiments described herein provide a physical chunk number (PCN), or a physical page number (PPN), by which a controller can access the next available chunks (or pages) in a programming sequence optimized by concurrency. By incrementing the PCN, the controller can program consecutive chunks in the optimized programming sequence. In one embodiment, the programming sequence is determined at the time of initial configuration and the sequence seeks to synchronize data programming and data sending operations in subcomponents of the storage system to minimize contention and wait time. In one embodiment, the PCN includes an index portion to a superblock table with entries that reference specific blocks within the subcomponents in a sequence that mirrors the optimized programming sequence, and a local address portion that references a particular chunk to be programmed or read.

26 Claims, 12 Drawing Sheets

FIGURE 9

INITIAL VALUES

| LCN | PCN |
|---|---|
| 0 | 00008000h |
| 1 | 00008000h |
| 2 | 00008000h |
| ... | |

148

AFTER WRITES

| LCN | PCN |
|---|---|
| 0 | 10070000h |
| 1 | 10070001h |
| 2 | 10070002h |
| 3 | 50010014h |
| 4 | 00900104h |
| 5 | 00340005h |
| ... | |

148

| 1007 | 0001h |

906   908

| SUPERBLOCK 156 | | | | | | | | | | | | | | | | | |
|---|---|---|---|---|---|---|---|---|---|---|---|---|---|---|---|---|---|
| | 0 | 0 | 0 | 0 | 0 | 0 | 0 | 0 | 1 | 1 | 1 | 1 | 1 | 1 | 1 | 1 | CE |
| | 0 | 0 | 0 | 0 | 1 | 1 | 1 | 1 | 0 | 0 | 0 | 0 | 1 | 1 | 1 | 1 | Die |
| | 0 | 0 | 1 | 1 | 0 | 0 | 1 | 1 | 0 | 0 | 1 | 1 | 0 | 0 | 1 | 1 | Plane |
| | 0 | 1 | 0 | 1 | 0 | 1 | 0 | 1 | 0 | 1 | 0 | 1 | 0 | 1 | 0 | 1 | Channel |
| ... | | | | | | | | | | | | | | | | | |
| 1007 | 1007 | 1007 | 1007 | 1007 | 1007 | 1007 | 1007 | 1007 | 1007 | 1007 | 1007 | 1007 | 1007 | 1007 | 1007 | 1007 | |
| 1008 | 1008 | 1008 | 1008 | 1008 | 1008 | 1008 | 1008 | 1008 | 1008 | 1008 | 1008 | 1008 | 1008 | 1008 | 1008 | 1008 | |
| 1009 | 1009 | 1009 | 2015 | 1009 | 1009 | 1009 | 1009 | 1009 | 1009 | 1009 | 1009 | 1009 | 1009 | 1009 | 1009 | 1009 | |
| ... | | | | | | | | | | | | | | | | | |

*FIGURE 10*

| PCN | Block | Page | | | | | | | CE | Die | Plane | Channel |
|---|---|---|---|---|---|---|---|---|---|---|---|---|
| 0 | 1007 | 0 | 0 | 0 | 0 | 0 | 0 | 0 | 0 | 0 | 0 | 0 |
| 1 | 1007 | 0 | 0 | 0 | 0 | 0 | 0 | 0 | 0 | 0 | 0 | 1 |
| 2 | 1007 | 0 | 0 | 0 | 0 | 0 | 0 | 0 | 0 | 0 | 1 | 0 |
| 3 | 1007 | 0 | 0 | 0 | 0 | 0 | 0 | 0 | 0 | 0 | 1 | 1 |
| 4 | 1007 | 0 | 0 | 0 | 0 | 0 | 0 | 0 | 0 | 1 | 0 | 0 |
| 5 | 1007 | 0 | 0 | 0 | 0 | 0 | 0 | 0 | 0 | 1 | 0 | 1 |
| 6 | 1007 | 0 | 0 | 0 | 0 | 0 | 0 | 0 | 0 | 1 | 1 | 0 |
| 7 | 1007 | 0 | 0 | 0 | 0 | 0 | 0 | 0 | 0 | 1 | 1 | 1 |
| 8 | 1007 | 0 | 0 | 0 | 0 | 0 | 0 | 0 | 1 | 0 | 0 | 0 |
| 9 | 1007 | 0 | 0 | 0 | 0 | 0 | 0 | 0 | 1 | 0 | 0 | 1 |
| A | 1007 | 0 | 0 | 0 | 0 | 0 | 0 | 0 | 1 | 0 | 1 | 0 |
| B | 1007 | 0 | 0 | 0 | 0 | 0 | 0 | 0 | 1 | 0 | 1 | 1 |
| C | 1007 | 0 | 0 | 0 | 0 | 0 | 0 | 1 | 1 | 1 | 0 | 0 |
| D | 1007 | 0 | 0 | 0 | 0 | 0 | 0 | 1 | 1 | 1 | 0 | 1 |
| E | 1007 | 0 | 0 | 0 | 0 | 0 | 0 | 1 | 1 | 1 | 1 | 0 |
| F | 1007 | 0 | 0 | 0 | 0 | 0 | 0 | 1 | 1 | 1 | 1 | 1 |
| 10 | 1007 | 0 | 0 | 0 | 0 | 0 | 0 | 0 | 0 | 0 | 0 | 0 |
| 11 | 1007 | 0 | 0 | 0 | 0 | 0 | 0 | 0 | 0 | 1 | 0 | 1 |
| 12 | 1007 | 0 | 0 | 0 | 0 | 0 | 0 | 0 | 1 | 1 | 1 | 0 |
| 13 | 1007 | 0 | 0 | 0 | 0 | 0 | 0 | 0 | 1 | 1 | 1 | 1 |
| 14 | 1007 | 0 | 0 | 0 | 0 | 0 | 0 | 0 | 0 | 0 | 0 | 0 |
| 15 | 1007 | 0 | 0 | 0 | 0 | 0 | 0 | 0 | 1 | 1 | 1 | 1 |
| 16 | 1007 | 0 | 0 | 0 | 0 | 0 | 0 | 0 | 1 | 1 | 0 | 0 |
| 17 | 1007 | 0 | 0 | 0 | 0 | 0 | 0 | 0 | 1 | 1 | 1 | 1 |

SYSTEM AND METHOD FOR MANAGING DATA ACCESS IN NON-VOLATILE MEMORY

BACKGROUND

Non-volatile solid-state storage systems typically include a number of subcomponents that are accessible by multiple data channels. For example, a storage system may have multiple data channels, with each channel reaching multiple devices. Each of those devices may be further divided into subcomponents such as dies and planes. Because data are sent serially into the available data channels for programming and the amount of time required for sending data and programming data are different, controllers of such storage systems need to manage access to these subcomponents in order to maximize programming performance.

BRIEF DESCRIPTION OF THE DRAWINGS

Systems and methods which embody the various features of the invention will now be described with reference to the following drawings, in which:

FIG. 9 shows an example mapping table in accordance with one embodiment.

FIG. 10 shows an example superblock table in accordance with one embodiment.

FIG. 11 shows an example physical chunk number table in accordance with one embodiment.

DETAILED DESCRIPTION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Overview

The present invention is directed to systems and methods for improving access to non-volatile solid-state storage systems. Embodiments described herein provide a physical chunk number (PCN), or a physical page number (PPN), by which a controller can access the next available chunks (or pages) in a programming sequence optimized by concurrency. By incrementing the PCN, the controller can program consecutive chunks in the optimized programming sequence. In one embodiment, the programming sequence is determined at the time of initial configuration and the sequence seeks to synchronize data programming and data sending operations in subcomponents of the storage system to minimize contention and wait time. In one embodiment, the PCN includes an index portion to a superblock table with entries that reference specific blocks within the subcomponents in a sequence that mirrors the optimized programming sequence, and a local address portion that references a particular chunk to be programmed or read.

System Overview

Figure 1:
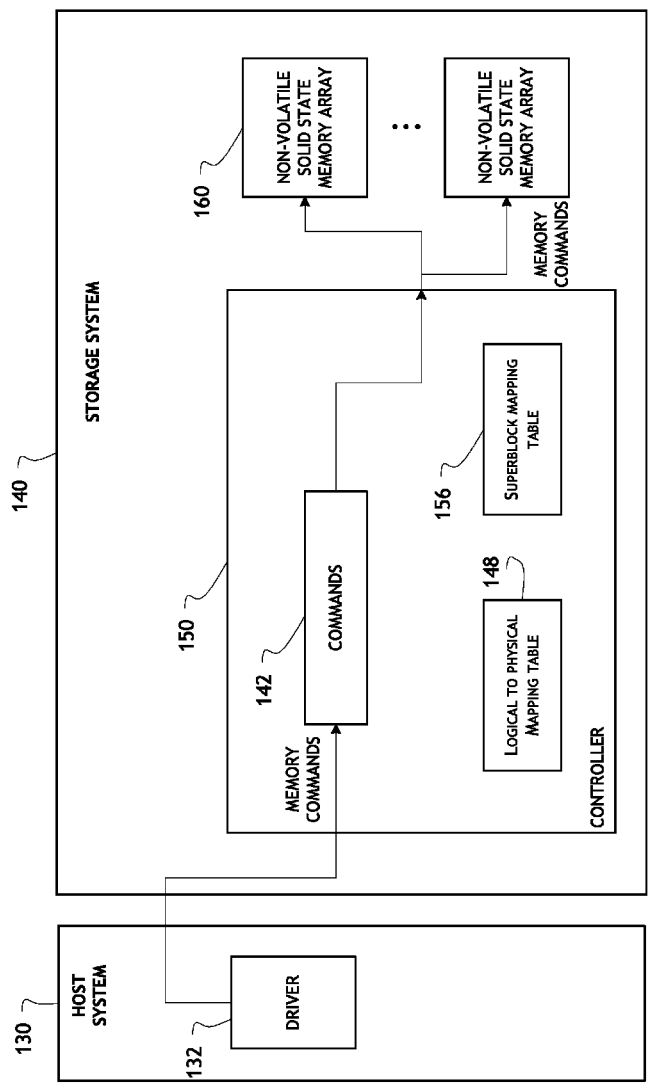
FIG. 1 is a block diagram illustrating a solid-state storage system according to one embodiment.

FIG. 1 is a block diagram illustrating a storage system embodiment that implements data access with PCNs. As shown, a storage system 140 includes a controller 150, which in turn includes a command queue 142. In one embodiment, the host command queue 142 receives memory commands from a driver 132 residing within a host system 130, and the memory commands may include write and read commands issued by the host system 130. As further shown in FIG. 1, in one embodiment, the controller 150 executes the commands in the host command queue 142 in one or more non-volatile solid-state memory arrays 160. The controller in one embodiment uses a logical to physical address mapping table 148 and a superblock mapping table 156 to process commands from the command queue 142. In one embodiment, the controller additionally executes internal commands such as garbage collection and/or wear-leveling, and such commands may be stored in the command queue 142 or in one or more other queues.

Figure 2:
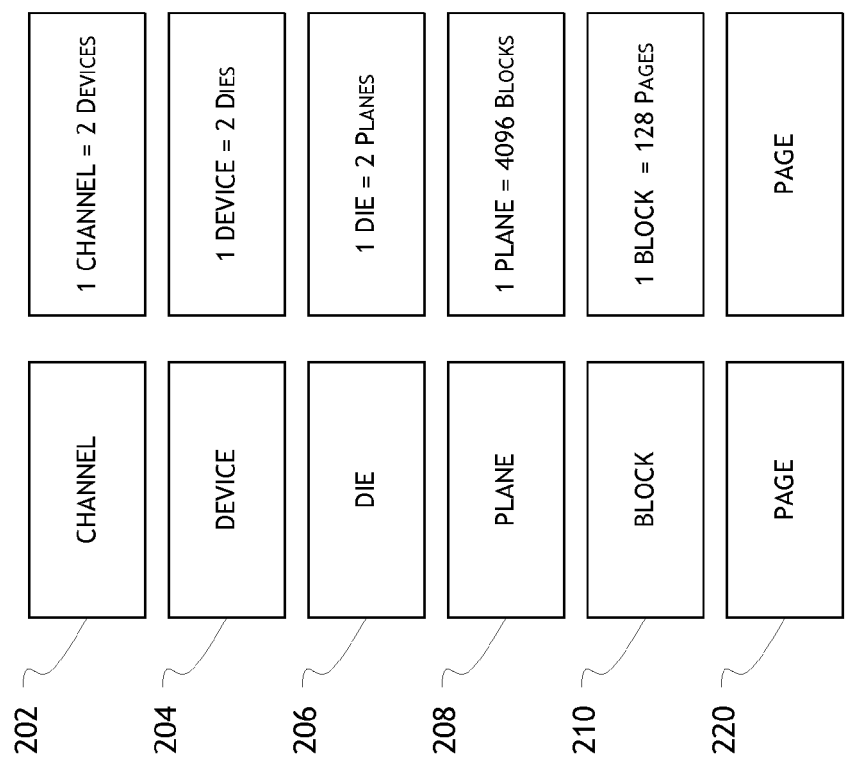
FIG. 2 illustrates the data architecture of an example solid-state storage system according to one embodiment.

FIG. 2 illustrates the data architecture of an example solid-state storage system according to one embodiment. In one embodiment, a storage system includes one or more channels 202, which includes one or more devices 204, which in turn includes one or more dies 206. In one embodiment, each die 206 includes one or more planes 208, which includes a plurality of blocks 210. Finally, each block may include a number of pages 212. In the example shown in FIG. 2, the channel includes two devices, each having two dies, each having two planes. Each plane has 4096 blocks, and each block has 128 pages.

Achieving Concurrency in Programming Media

Figure 3:
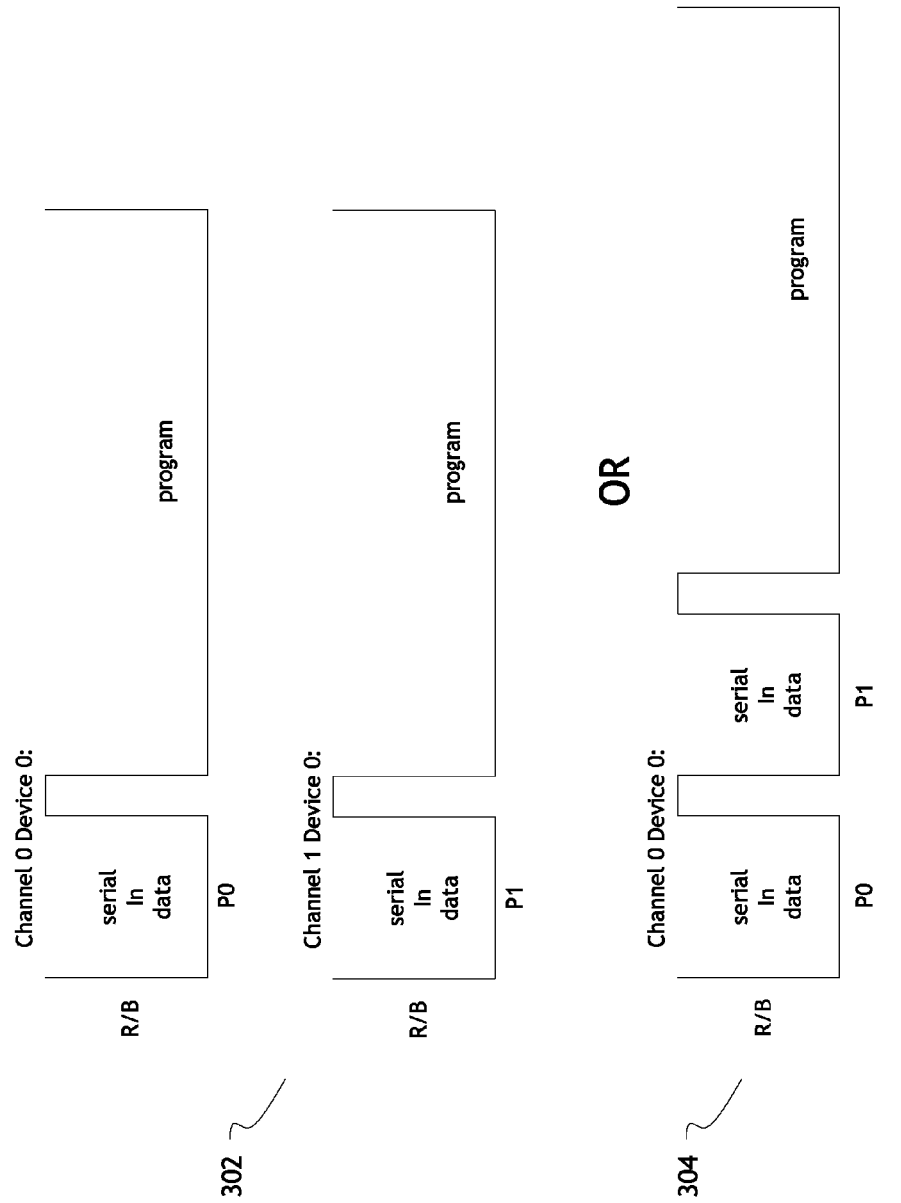
FIG. 3 illustrates an example programming sequence in accordance with one embodiment.

FIG. 3 illustrates example programming sequences for programming two pages of data. Programming sequences 302 and 304 are timeline views of two different programming configurations. Programming sequence 302 shows that data are being serially sent ("serialed in") to two devices on two different channels (one on channel 0 and one on channel 1). The data are concurrently serialed in and the programming ends in both devices at the same time. As depicted, the time to program to media (around 900 μs) is typically much longer than the time to serial in data (around 25 μs). Programming sequence 304 shows a different configuration in which both pages are sent to the same device (device 0 on channel 0). Here, the data are serialed in consecutively but are programmed at the same time. The total time for programming sequence 304 is around 950 μs (900 μs+25 μs+25 μs).

Figure 4:
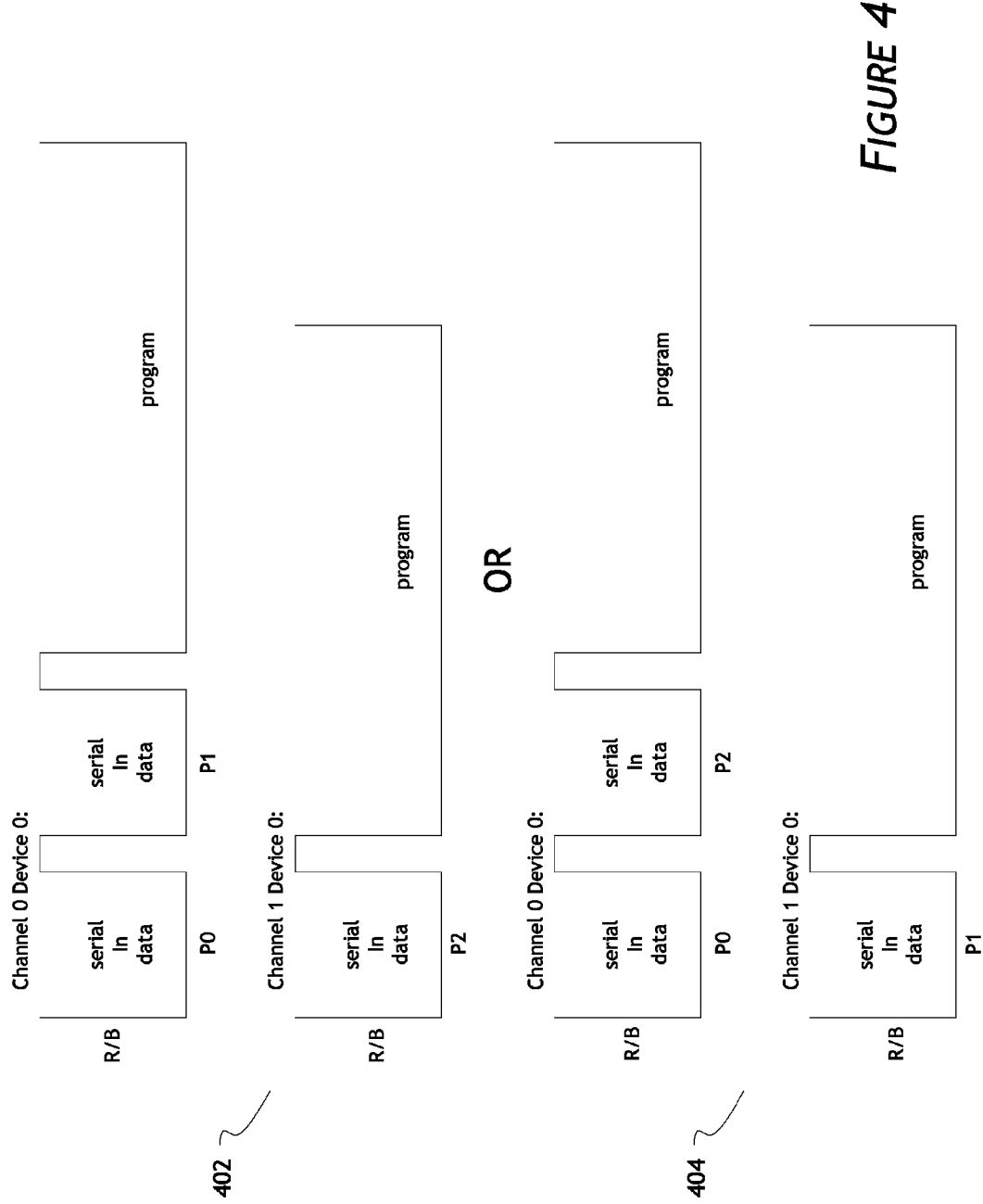
FIG. 4 illustrates an example programming sequence in accordance with one embodiment.

FIG. 4 illustrates an example programming sequence for programming three pages of data. Programming sequence 402 shows that three pages data are being serialed in to two devices on two different channels (device 0 on channel 0 and device 0 on channel 1). Pages P0 and P1 are sent to channel 0 device 0 while page P2 is sent to channel 1 device 0. Programming sequence 404 shows a different sequence in which pages P0 and P2 are sent to channel 0 device 0 while page P1 is sent to channel 1 device 0. Both sequences achieve some concurrency as shown. However, as the number of pages to be programmed increases, the task of assigning pages to the proper devices/channels to maximize concurrently becomes more complex.

Figure 5:
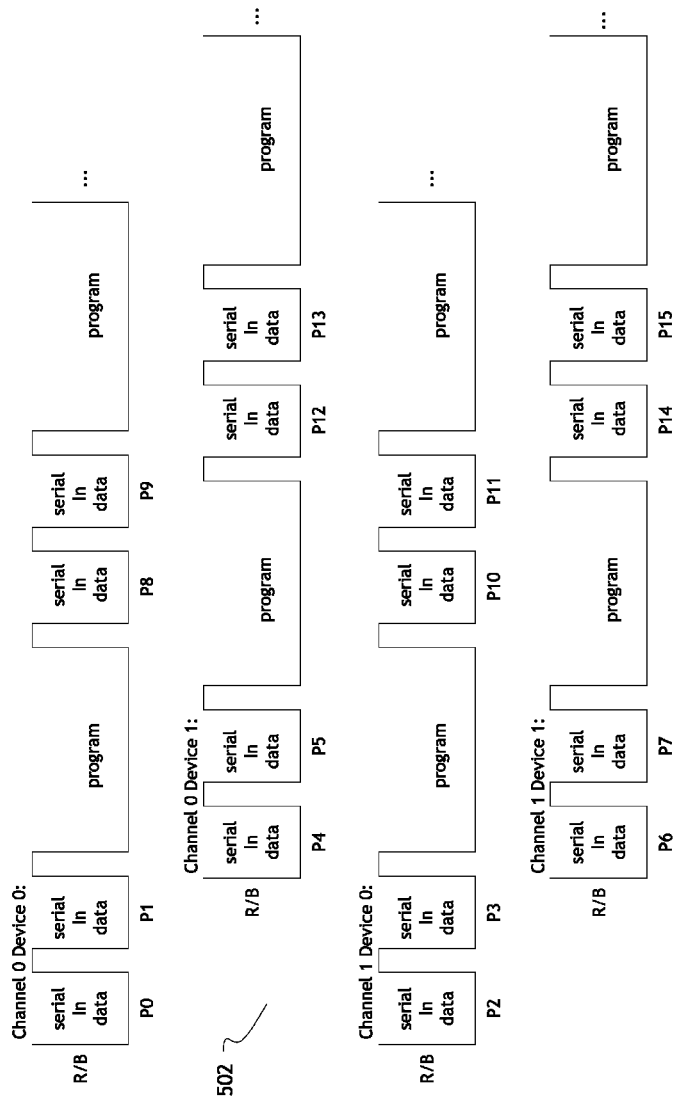
FIG. 5 illustrates an example programming sequence in accordance with one embodiment.
Figure 6:
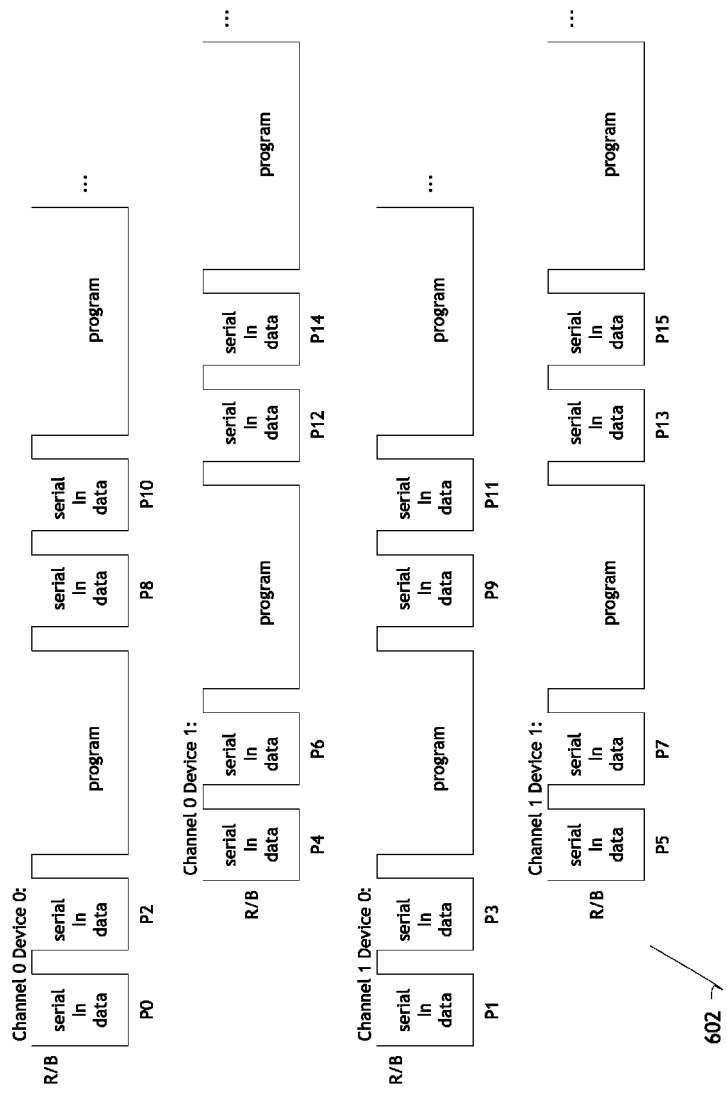
FIG. 6 illustrates an example programming sequence in accordance with one embodiment.
Figure 7:
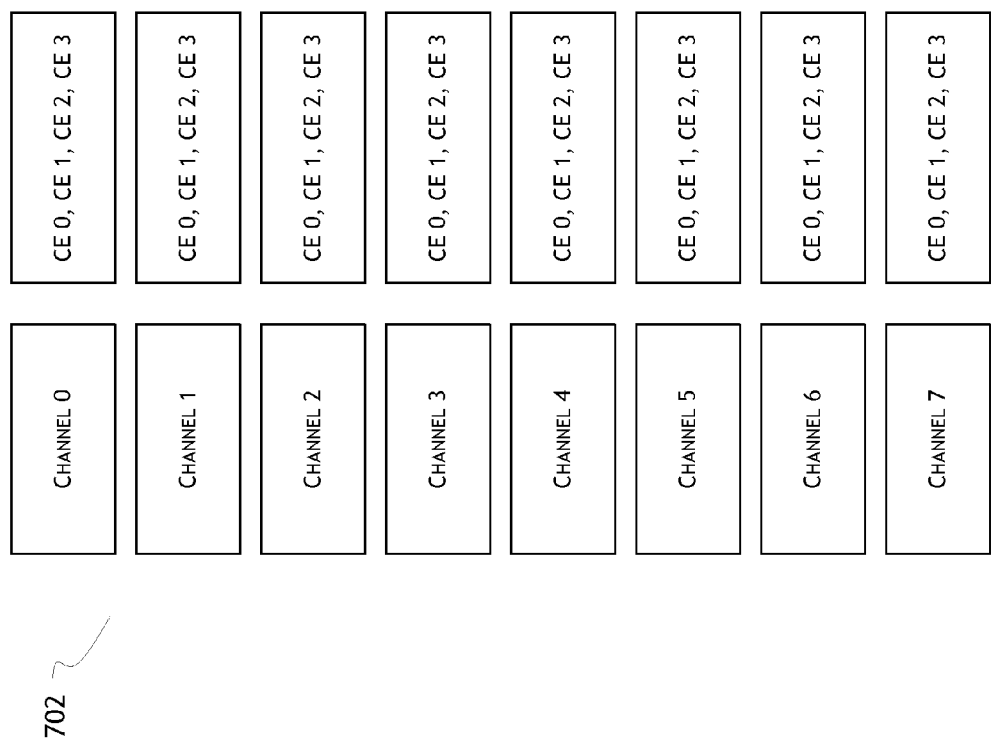
FIG. 7 illustrates an example data channel assignment in accordance with one embodiment.

FIG. 5 illustrates an example programming sequence in accordance with one embodiment. Programming sequence 502 shows the programming of 16 pages in a solid-state memory storage system having two channels and two devices per channel. The pages P0-P15 are assigned in programming sequence 502 in a rotating fashion to maximize concurrency. For example P0, P1, P8 and P9 are assigned to channel 0 device 0. Note that while P0 and P1 are being serialed into channel 0 device 0, no other data can be serialed into channel 0 device 1. So in one embodiment, concurrency is achieved in part by ensuring that devices sharing the same channel are in opposite states (data serial in vs. data programming) so that a serial in operation can take place for one device while the other device in the channel is being programmed. For example, in channel 0, device 0 first receives serial in data P0 and P1. While P0 and P1 are programmed into channel 0 device 0, channel 0 is free to process more data being serialed in, which in this case include pages P4 and P5 for channel 0 device 1. Later on, while channel 0 device 1 is still being programmed, channel 0 concurrently receives pages P8 and P9 for channel 0 device 0. In this manner, the programming of many pages can be arranged to achieve concurrency. Those skilled in the art will recognize that the number of channels and devices shown in FIG. 5 are for illustration only and that similar programming arrangements can be used in other solid-state data storage system with a different number of channels and devices. For example, FIG. 7 is a block diagram showing an example channel assignments in accordance with one embodiment. In the embodiment of FIG. 7, eight channels 0-7 each has four devices (indicated by the abbreviation CE). FIG. 6 shows an alternative programming sequence 602 that is a variation of the programming sequence 502. In practice, when a write command necessitates the programming of a number of sequential chunks/pages, the controller needs to implement substantial logic to achieve the type of the example optimal programming sequences shown in FIGS. 5 and 6.

Managing Data Access with Physical Chunk Numbers

Figure 8:
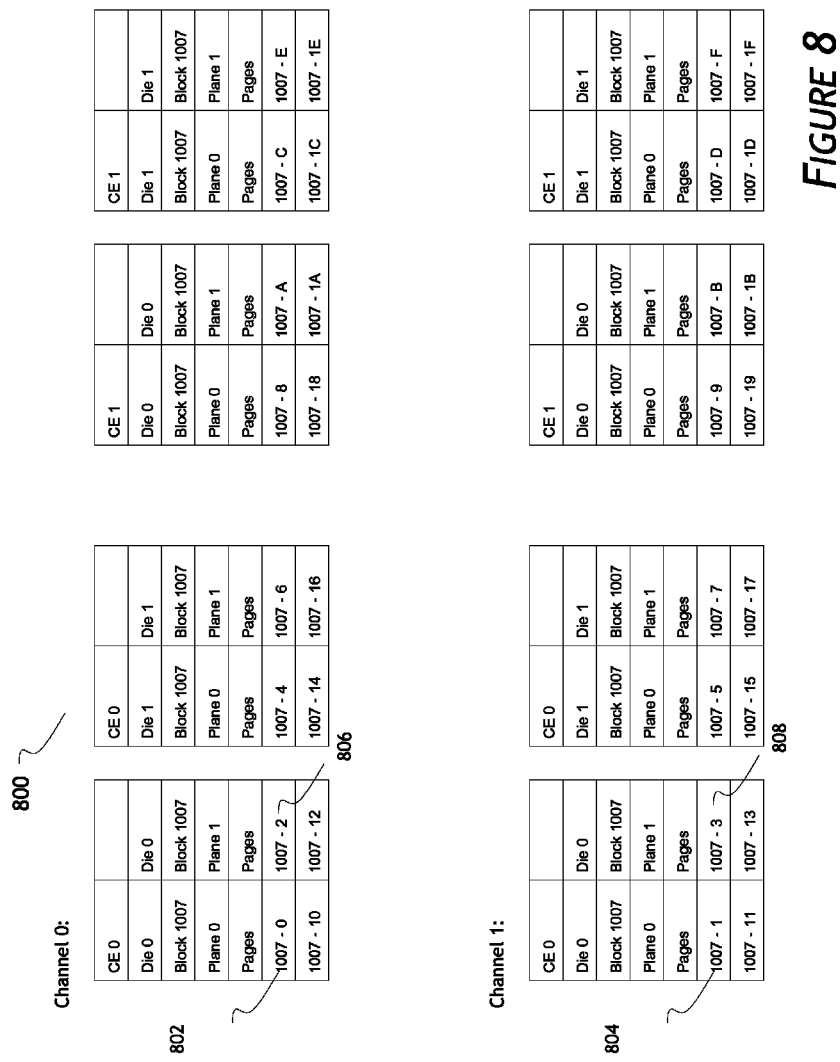
FIG. 8 illustrates an example of programming using physical chunk numbers accordance with one embodiment.

FIG. 8 shows an example assignment of pages using physical chunk numbers in accordance with one embodiment. The solid-state storage configuration 800 shown in FIG. 8 reflects the same arrangement as previously shown in the example in FIGS. 5 and 6. There are two data channels (channels 0 and 1), and within each channel there are two devices (CEs 0 and 1). Each device has two planes (planes 0 and 1).

Example physical chunk numbers 802 and 804 illustrate the use of physical chunk numbers (PCNs) for accessing an appropriate chunk (shown as a page here) within the storage system. One feature of PCNs is that they are arranged sequentially in a manner that reflects an optimized programming sequence with respect to concurrency. Therefore, a controller can simply increment to the next physical chunk number to locate the "next" chunk/page for programming. FIG. 8 illustrates the use of PCN (in hexadecimal format) to implement the programming sequence shown in FIG. 6. As shown in FIG. 8, PCN 802 (ending in a "0" and corresponding to "P0" in FIG. 6) is referencing page 0 of block 1007 within plane 0 of die 0, which is within device 0 of channel 0. PCN 804 (ending in a "1" and corresponding to "P1" in FIG. 6) is referencing page 0 of block 1007 within plane 0 of die 0 of device 0 within channel 1. PCNs 806 and 808 follow the pattern of correspondence, as do the rest of the PCNs shown in FIG. 8. Thus, by simply incrementing the PCN, the controller can automatically obtain the appropriate next location in the desired programming sequence across the various channels, devices, dies, and planes.

FIGS. 9-11 further illustrate the use of PCNs in accordance with one embodiment. FIG. 9 illustrates example entries in the logical to physical address mapping table 148 (previously shown in FIG. 1). The mapping table 148 maps logical chunk numbers (LCNs) to PCNs. In one embodiment, when the storage system is first initialized, all LCNs have the initial value of "00008000h" as shown in the top example mapping table. Other initial values can be used as well as long as they do not conflict with PCNs that address user data portion. The bottom mapping table shows a few selected entries after several write commands are executed. Each LCN is now assigned to a "real" PCN that actually references data. The format of the PCN in one embodiment includes a superblock index portion 906 and a local address portion 908. The example PCN "100070001h" has a superblock index portion that reads "1007," which references a superblock "1007" and a local address portion "0001."

With the superblock index, the controller can consult a superblock table 156 (previously shown in FIG. 1) to determine the block mapping. An example superblock table is shown in FIG. 10. As shown, each indexed superblock has a number of corresponding entries, each referencing a specific block within the individual plane/die/device/channel. With the superblock table 156, the controller can use the superblock index portion "1007" (previous example shown in FIG. 9) to locate the superblock mapping. Here, as shown, superblock "1007" includes blocks 1007 from the various planes/dies/devices/channels in the order as shown in the table 156. Using the superblock table 156, the controller can then use the local address portion to determine the specific chunk/page address at which to program/read data. For example, the local address portion "0001" points to the first entry in the superblock table 156 for superblock 1007, which indicates the first page/chunk in block 1007 of plane 0 of die 0 of device 0 of channel 0. As another example, the local address portion "0002" would reference the second entry in the superblock table 156 for 1007, which indicates the first page/chunk in block 1007 of plane 0 of die 0 of device 0 of channel 1. The sequence cycles through all the blocks listed in the entries, before moving to the next chunk/page in the individual block. So the local address portion "0010" would reference again point to block 1007 of plane 0 of die 0 of device 0 of channel 0, only this time it would reference the second chunk/page of that block (since the first chunk/page was already used in the first cycle through by the PCN with the local address portion "0001" as described above). This cyclical progression is illustrated in the PCN example table of FIG. 11, wherein the "PCN" column shows the local address portion of the PCN and how it correlates to specific pages within the various planes/dies/devices/channels. In one embodiment, this progression of ascending PCN as mapped to the proper "next" chunk/page in the optimized programming sequence can be inferred from the entries in superblock table 156 as discussed above. Thus, by simply incrementing the PCN and by consulting the superblock table, the controller can automatically obtain the proper "next" chunk/page for programming.

Although FIGS. 10-11 depict an embodiment with two or more channels, other embodiments may include only one channel, and as such the "channel" row/column may be eliminated from one or both of the tables shown in FIGS. 10 and 11.

Also, the PCN increment sequence and the associated arrangement of the "Channel," "CE," "Die," and "Plane" rows/columns in the figures are for illustrative purposes only. In other embodiments, they can be arranged differently. As noted above, a PCN increment sequence is dependent upon the design/selection of the programming sequence, and the PCN increment sequence shown in FIGS. 10-11 is just one example. For example, in FIG. 11, the rightmost column is "Channel" because the associated programming sequence seeks to exhaust the available channels first. In other embodiments in which the programming sequences seek to exhaust the memory units in a different order, the arrangement of the columns may be different (e.g. having "CE" as the rightmost column).

The superblock table in FIG. 10 also provides a mechanism for handling newly detected bad blocks. In the example table shown, superblock "1009" includes most entries referencing block 1009 in the various planes. One entry however, has been replaced by a reference to block 2015 because block 1009 for that plane is a bad block. This eliminates the need to update entries in a mapping table.

Figure 12A:
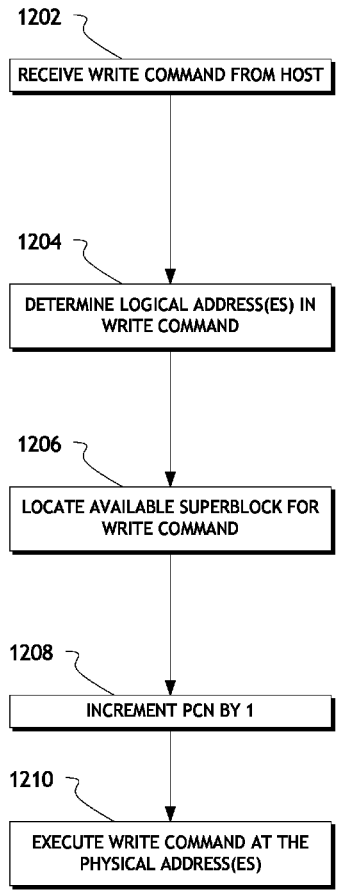
FIG. 12A is a flow diagram illustrating a process of processing a write command using physical chunk numbers in accordance with one embodiment.

FIG. 12A is a flow diagram illustrating a process of processing a write command using PCNs in accordance with one embodiment. The process starts at block 1202, where a write command is received by the controller from the host. Alternatively, the write command may originate from an internal memory operation such as garbage collection and/or wear leveling. Then in block 1204, the controller determines the logical address(es) in the write command. In block 1206, the controller locates an available superblock for the write command. Then in block 1208, the controller increments the PCN for that superblock (e.g., by 1) to obtain the proper physical address(es) for writing. In one embodiment, the controller also handles switching to a new PCN for a different superblock when a superblock is full. For example, after incrementing the PCN by 1, the controller may determine whether the post-increment PCN is still valid. If not, the controller will provide a different superblock and PCN for writing. The controller may also store the new superblock number and the next PCN for that superblock. In another embodiment, the controller determines in block 1206 whether the current superblock is full and provides a new superblock as needed. In block 1210, the controller executes the write command at the located physical address(es).

In one embodiment, the controller keeps track of the next write location, which includes where writing is to occur next after the storage system is powered up. In one embodiment, the controller obtains the next write location by incrementing the PCN by 1 after the execution of the write command in block 1210. Thus, when the next write command is received and its logical address(es) determined, the controller can directly proceed to programming at the physical address(es) located with the pre-incremented PCN (instead of performing block 1208).

Figure 12B:
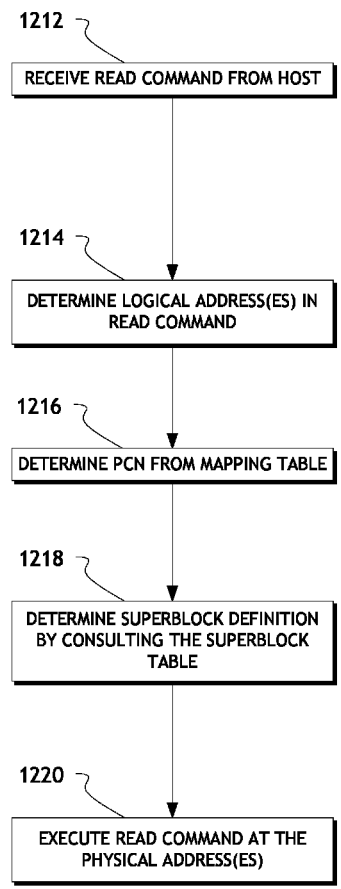
FIG. 12B is a flow diagram illustrating a process of processing a read command using physical chunk numbers in accordance with one embodiment.

FIG. 12B is a flow diagram illustrating a process of processing a read command using PCNs in accordance with one embodiment. The process starts at block 1212, where a read command is received by the controller from the host. Alternatively, the read command may originate from an internal memory operation such as garbage collection and/or wear leveling. Then in block 1214, the controller determines the logical address(es) in the read command. In block 1216, the controller locates PCN(s) for the given logical address(es) from the mapping table (e.g. the mapping table 148). Then in block 1218, the controller determines the superblock definition by consulting the superblock table 156. Once the superblock table is consulted, the PCN(s) can be resolved to the proper physical address(es). In block 1220, the controller executes the read command at the physical address(es).

In the processes depicted in FIGS. 12A and 12B, once a proper PCN is determined, in one embodiment the controller extracts information from the actual bits in the PCN to carry out the write or read command. For example, in the 2-channel embodiment of FIG. 11, the controller would extract the "Channel" bit in the PCN and then direct the command and PCN to the appropriate channel, where the remaining bits for "CE," "Die," and "Plane" would be extracted to determine the final destination. In another embodiment, the controller sends the PCN to the channels, and each channel would check whether its bit was asserted, and if it is, the channel matching the asserted "Channel" bit would then use the "CE," "Die," and "Plane" bits to assert on its bus. In one embodiment, once the PCN has been properly deciphered, the block/page/chunk number(s) would be provided (along with the user data for a write command) on the bus to the memory array.

CONCLUSION

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A storage system comprising:
    a non-volatile solid-state memory array, the memory array comprising units of memory accessible via one or more data channels; and
    a controller in communication with the memory array via the one or more data channels, the controller configured to:
        maintain an assignment table comprising information related to a memory access configuration that:
            groups a plurality of physical addresses in the memory array into a plurality of logical groups with the physical addresses for each logical group organized in a sequence, and
            associates a physical address number to each physical address, the physical address number corresponding to the position of the physical address in the sequence,
        wherein the physical addresses in each logical group are distributed across the units of memory accessible via the one or more data channels to maximize concurrent access to the memory array;
        receive a memory command from a host system for execution in the memory array, the memory command associated with one or more logical addresses;
        determine one or more physical addresses for the memory command by using the assignment table; and
        execute the memory command in accordance with the one or more determined physical addresses,
        wherein physical address numbers for each of the plurality of logical groups are assigned to physical addresses that are accessible via different data channels on a rotating basis.

2. The storage system of claim 1, wherein the memory command is a write command and wherein the controller is further configured to determine the one or more physical addresses for the memory command by:
  locating a logical group for the write command;
  determining a physical address number that was last used in the located logical group; and
  incrementing the last used physical address number to determine one or more physical addresses for the write command.

3. The storage system of claim 1, wherein the memory command is a read command and wherein the controller is further configured to determine the one or more physical addresses for the memory command by:
  locating, in a mapping table maintained by the controller, one or more physical address numbers for the one or more logical addresses associated with the read command.

4. The storage system of claim 1, wherein each physical address number comprises:
  a first portion that references the logical group to which a physical address associated with the physical address number belongs; and
  a second portion that references a position of the associated physical address in the sequence of physical addresses in the logical group.

5. The storage system of claim 1, wherein the information in the assignment table comprises:
  a list of logical group entries referencing the plurality of logical groups; and
  for each logical group entry, a list of blocks within the referenced logical group.

6. The storage system of claim 5, wherein the sequence for each logical group comprises:
  a first sub-sequence of physical addresses comprising a first physical address from each block in the list of blocks, the first physical addresses arranged according to the order in the list of blocks; and
  a second sub-sequence of physical addresses following the first sub-sequence, the second sub-sequence comprising a second physical address that follows the first physical address from each block in the list of blocks, the second physical addresses arranged according to the order in the list of blocks.

7. The storage system of claim 1, wherein the assignment table is updated when a block in the memory array is detected to have become a bad block.

8. The storage system of claim 1, wherein the memory array comprises one or more devices accessible via the one or more data channels, each device comprising one or more dies, each die comprising one or more planes, each plane comprising a plurality of blocks.

9. The storage system of claim 8, wherein physical address numbers for each of the plurality of logical groups are assigned to physical addresses that are on different devices within the memory array on a rotating basis.

10. The storage system of claim 8, wherein physical address numbers for each of the plurality of logical groups are assigned to physical addresses that are on different dies within the memory array on a rotating basis.

11. The storage system of claim 8, wherein physical address numbers for each of the plurality of logical groups are assigned to physical addresses that are on different planes within the memory array on a rotating basis.

12. The storage system of claim 1, wherein the physical addresses and the logical addresses comprise page addresses.

13. The storage system of claim 1, wherein the physical addresses and the logical addresses comprise chunk addresses.

14. A method of managing data access to a non-volatile solid-state memory array comprising units of memory accessible via one or more data channels, the method comprising:
  maintaining, in a controller for the memory array, an assignment table comprising information related to a memory access configuration that:
    groups a plurality of physical addresses in the memory array into a plurality of logical groups with the physical addresses for each logical group organized in a sequence, and
    associates a physical address number to each physical address, the physical address number corresponding to the position of the physical address in the sequence,
    wherein the physical addresses in each logical group are distributed across the units of memory accessible via the one or more data channels to maximize concurrent access to the memory array;
  receiving, in a controller, a memory command from a host system for execution in the memory array, the memory command associated with one or more logical addresses;
  in response to the memory command, determining, by the controller, one or more physical addresses for the memory command by using the assignment table; and
  executing, by the controller, the memory command in accordance with the one or more determined physical addresses,
  wherein physical address numbers for each of the plurality of logical groups are assigned to physical addresses that are accessible via different data channels on a rotating basis.

15. The method of claim 14, wherein the memory command is a write command and wherein determining the one or more physical addresses for the memory command further comprises:
  locating a logical group for the write command;
  determining a physical address number that was last used in the located logical group; and
  incrementing the last used physical address number to determine one or more physical addresses for the write command.

16. The method of claim 14, wherein the memory command is a read command and wherein determining the one or more physical addresses for the memory command further comprises:
  locating, in a mapping table maintained by the controller, one or more physical address numbers for the one or more logical addresses associated with the read command.

17. The method of claim 14, wherein each physical address number comprises:
  a first portion that references the logical group to which a physical address associated with the physical address number belongs; and
  a second portion that references a position of the associated physical address in the sequence of physical addresses in the logical group.

18. The method of claim 14, wherein the information in the assignment table comprises:
  a list of logical group entries referencing the plurality of logical groups; and
  for each logical group entry, a list of blocks within the referenced logical group.

19. The method of claim 18, wherein the sequence for each logical group comprises:
  a first sub-sequence of physical addresses comprising a first physical address from each block in the list of blocks, the first physical addresses arranged according to the order in the list of blocks; and a second sub-sequence of physical addresses following the first sub-sequence, the second sub-sequence comprising a second physical address that follows the first physical address from each block in the list of blocks, the second physical addresses arranged according to the order in the list of blocks.

20. The method of claim 14, further comprising:

updating the assignment table when a block in the memory array is detected to have become a bad block.

21. The method of claim 14, wherein the memory array comprises one or more devices accessible via the one or more data channels, each device comprising one or more dies, each die comprising one or more planes, each plane comprising a plurality of blocks.

22. The method of claim 21, wherein physical address numbers for each of the plurality of logical groups are assigned to physical addresses that are on different devices within the memory array on a rotating basis.

23. The method of claim 21, wherein physical address numbers for each of the plurality of logical groups are assigned to physical addresses that are on different dies within the memory array on a rotating basis.

24. The method of claim 21, wherein physical address numbers for each of the plurality of logical groups are assigned to physical addresses that are on different planes within the memory array on a rotating basis.

25. The method of claim 14, wherein the physical addresses and the logical addresses comprise page addresses.

26. The method of claim 14, wherein the physical addresses and the logical addresses comprise chunk addresses.

* * * * *